No. 623,197. Patented Apr. 18, 1899.
L. G. ADAMS & C. B. MASTERS.
BRONZING MACHINE.
(Application filed Apr. 25, 1898.)
(No Model.)
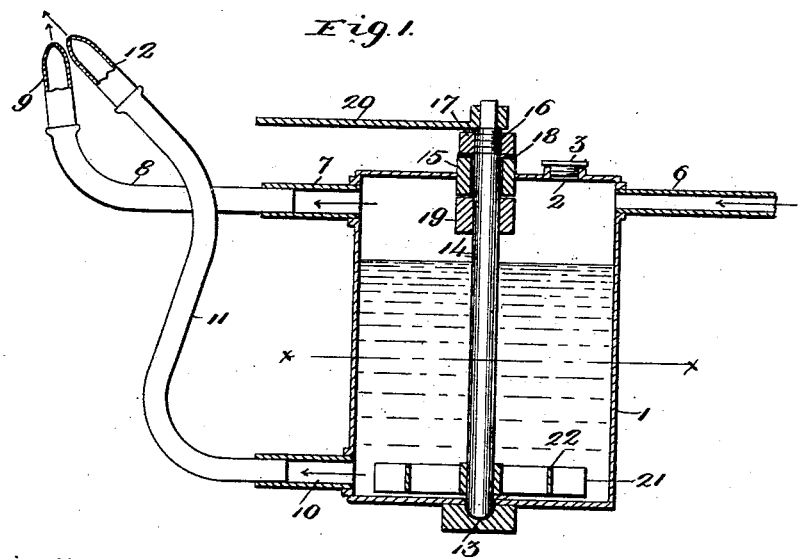
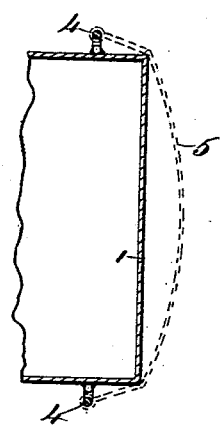
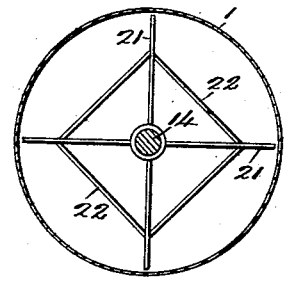
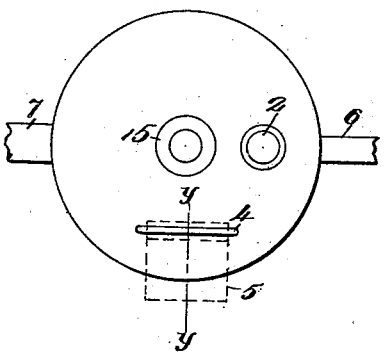
WITNESSES:
INVENTORS
Leon G. Adams.
Charles B. Masters.
BY
ATTORNEYS
THE NORRIS PETERS CO., PHOTO-LITHO., WASHINGTON, D. C.

UNITED STATES PATENT OFFICE.

LEON G. ADAMS AND CHARLES B. MASTERS, OF ST. LOUIS, MISSOURI.

BRONZING-MACHINE.

SPECIFICATION forming part of Letters Patent No. 623,197, dated April 18, 1899.

Application filed April 25, 1898. Serial No. 678,796. (No model.)

*To all whom it may concern:*

Be it known that we, LEON G. ADAMS and CHARLES B. MASTERS, citizens of the United States, residing at St. Louis, in the State of Missouri, have invented certain new and useful Improvements in Bronzing-Machines, of which the following is a full, clear, and exact description, reference being had to the accompanying drawings, forming a part thereof.

Our invention relates to improvements in bronzing-machines; and it consists in the novel arrangement and combination of parts, as will be hereinafter more particularly described, and pointed out in the claim.

In the drawings, Figure 1 is a vertical longitudinal section of our complete invention. Fig. 2 is a horizontal section taken on the line $x\,x$ of Fig. 1. Fig. 3 is a section taken on the line $y\,y$ of Fig. 4. Fig. 4 is a top plan view of our invention with parts removed, and Fig. 5 is an enlarged longitudinal section of one of the nozzles and pipe carrying the same.

The object of our invention is to construct a simple and effective bronzing-machine or hand device whereby the bronzing mixture contained therein is evenly distributed and deposited upon a wall, ceiling, or other surface to be decorated solely by air-pressure from any suitable source.

Briefly stated, the invention consists of a cylindrical chamber which is adapted to be held by the operator and contains the bronzing mixture to be deposited, a pipe connection leading to and in communication with the interior of said chamber, through which air is forced from a suitable supply, two flexible pipes leading from and also in communication with the interior of said chamber, the upper one conveying the air and the lower one conveying the mixture or bronzing liquid, nozzles forming the terminal ends of said last-named pipes and adapted to be adjusted in respect to one another in order to produce the desired result and properly direct the mixture to be deposited, an agitator contained within the chamber and adapted to be operated outside of the same by hand, whereby the consistency of the mixture is maintained at all times when the device is in use, and other details in the construction, as will be hereinafter more fully described.

Referring to the drawings, 1 represents a cylindrical chamber which is adapted to contain the bronzing material or mixture, the latter being admitted through the opening 2 and confined by the screw-plug 3. To the upper and lower ends of said chamber is secured a loop 4, to which are secured the opposite ends of a strap 5, which provides a means for holding the receptacle or chamber 1 by one hand of the operator. Connected to and in communication with the interior of the chamber 1 and adjacent to the top of the same is a pipe 6, which leads to any suitable air-supply; but in the present instance a rubber or other hose is employed and air-pressure maintained from the lungs of the operator which has been forced into practice to give the desired result. Projecting from the chamber 1 and located adjacent to the upper end or top of the same is a short pipe 7, which receives a lead pipe 8, terminating in a nozzle 9, through which air passes and is forced against the bronzing mixture for spreading the same. Also projecting from the receptacle 1 and located adjacent to the lower end or bottom of the same is a second pipe 10, which receives the end of a lead pipe 11, also terminating in a nozzle 12, through which the bronzing mixture is forced and adapted to be operated upon by the air issuing from the nozzle 9, the bronzing mixture and the air issuing from both nozzles simultaneously under the same pressure of air. By the employment of lead pipes the nozzles can be accurately adjusted and held in their proper position in respect to one another in order to produce the desired result and properly direct the mixture in any direction desired. Formed in the bottom of the chamber 1 is a socket 13, which receives the lower end of the vertical shaft 14, which passes loosely through a bearing 15, forming a part of the top of said chamber, and projects a suitable distance above the same. The upper projecting end of the shaft 14 is provided with screw-threads 16, over which a nut 17 is screwed, a washer 18 being interposed between said nut and bearing 15 for forming a liquid-tight connection. To the shaft immediately below the bearing 15 is secured a collar 19, which operates to hold the shaft in its proper position and prevent the same from being withdrawn from the chamber. To the upper projecting end of the shaft is secured an operating-crank 20, which is adapted to be operated by one hand of the operator while the device is being used for continuously stirring or agitating the mixture, whereby the consistency of the bronzing mixture is maintained at all times. Located within the chamber 1 and secured to the shaft adjacent to the bottom of said chamber is an agitator composed of wings or blades 21, each of which is braced by plates 22. Thus it will be seen that when the shaft 14 is turned or operated the agitator will also be turned, thoroughly mixing the bronzing liquid.

In practice the nozzles are constructed of glass and the same rigidly secured to the end of the lead pipes, as best shown in Fig. 5, by forcing or pressing the edge of the pipe around the flange 23 of the nipple.

We do not limit the application of our device solely to bronzing mixture, as other coloring liquid may be employed and likewise effectually deposited upon a surface desired to be colored or decorated.

Having fully described our invention, what we claim is—

A bronzing-machine, a chamber, an air-supply pipe leading to the same adjacent to the top thereof, a short pipe projecting from said chamber also located adjacent to the top of the same, a lead pipe received by said short pipe, a nozzle carried by the end of said lead pipe, a second short pipe projecting from said chamber adjacent to the bottom of the same, a lead pipe received by the same, a nozzle carried by the end of the same, a socket formed in the bottom of said chamber, an operating-shaft the lower end of which is located in said socket, an agitator secured to the lower end of said shaft, a bearing carried by the top of the receptacle through which the upper end of the shaft projects, a nut screwed on the said shaft, a washer interposed between said nut and bearing, a collar secured to the shaft immediately below the bearing, and a crank secured to the projecting end of the shaft, for operating same, substantially as described.

In testimony whereof we affix our signatures in presence of two witnesses.

LEON. G. ADAMS.
CHAS. B. MASTERS.

Witnesses:
C. F. KELLER,
F. H. HART.